United States Patent
Juhasz et al.

(10) Patent No.: US 12,533,258 B2
(45) Date of Patent: Jan. 27, 2026

(54) SURGICAL TREATMENT FOR GLAUCOMA

(71) Applicant: The Regents of the University of California, Oakland, CA (US)

(72) Inventors: Tibor Juhasz, Oakland, CA (US); James Jester, Oakland, CA (US); Eric Mikula, Oakland, CA (US)

(73) Assignee: The Regents Of The University Of California, Oakland, CA (US)

( * ) Notice: Subject to any disclaimer, the term of this patent is extended or adjusted under 35 U.S.C. 154(b) by 929 days.

(21) Appl. No.: 17/260,367

(22) PCT Filed: Jul. 15, 2019

(86) PCT No.: PCT/US2019/041834
§ 371 (c)(1),
(2) Date: Jan. 14, 2021

(87) PCT Pub. No.: WO2020/018436
PCT Pub. Date: Jan. 23, 2020

(65) Prior Publication Data
US 2021/0298945 A1    Sep. 30, 2021

Related U.S. Application Data
(60) Provisional application No. 62/698,551, filed on Jul. 16, 2018.

(51) Int. Cl.
*A61F 9/08*    (2006.01)
*A61F 9/008*    (2006.01)
(Continued)

(52) U.S. Cl.
CPC ............. *A61F 9/008* (2013.01); *G16H 20/40* (2018.01); *G16H 30/40* (2018.01);
(Continued)

(58) Field of Classification Search
None
See application file for complete search history.

(56) References Cited

U.S. PATENT DOCUMENTS 6,059,772 A * 5/2000 Hsia ............... A61F 9/009
606/4
2012/0259321 A1* 10/2012 Vera ............... A61F 9/00781
606/6

(Continued)

FOREIGN PATENT DOCUMENTS

WO    WO 2018/049246 A1    3/2018

OTHER PUBLICATIONS

Dongyul Chai, Tibor Juhasz et al. (2008), 3D finite element model of aqueous outflow to predict the effect of femtosecond laser created partial thickness drainage channels. Lasers Surg. Med., 40: 188-195. https://doi.org/10.1002/lsm.20608, viewed on Feb. 2, 2024.*

(Continued)

*Primary Examiner* — James M Kish
*Assistant Examiner* — James Moss
(74) *Attorney, Agent, or Firm* — Knobbe, Martens, Olson & Bear, LLP

(57) ABSTRACT

A glaucoma treatment apparatus including an imaging device capable of imaging the anterior segment of the eye, a treatment laser, an algorithm programmed to determine a location and a cross sectional area of a treatment based on a customized anatomy of the anterior segment of the eye including the trabecular meshwork (TM), the Schlemm's Canal (SC) and collector channels (CCS), obtained from pre-operative images of the anterior segment of the eye, a pre-operative intraocular pressure (IOP) level and a target IOP reduction as an inputs, and a processor configured to actuate the apparatus to create an outflow channel with a cross-sectional area and location or multiple outflow channels with multiple cross-sectional areas and locations from (Continued)

the anterior chamber (AC) to the SC across the TM, as determined by the algorithm to achieve the target intraocular pressure (IOP) reduction. Also disclosed is a method of reducing intraocular pressure in an eye.

15 Claims, 8 Drawing Sheets

(51) Int. Cl.
*G16H 20/40* (2018.01)
*G16H 30/40* (2018.01)
*A61B 17/00* (2006.01)

(52) U.S. Cl.
CPC ............ *A61B 2017/0019* (2013.01); *A61F 2009/00868* (2013.01); *A61F 2009/00878* (2013.01); *A61F 2009/00891* (2013.01)

(56) References Cited

U.S. PATENT DOCUMENTS

| | | | |
|---|---|---|---|
| 2012/0283557 A1* | 11/2012 | Berlin | A61F 9/009 600/407 |
| 2013/0103011 A1 | 4/2013 | Grant et al. | |
| 2015/0366706 A1 | 12/2015 | Belkin et al. | |
| 2017/0127938 A1* | 5/2017 | Izatt | A61F 9/00827 |
| 2018/0207029 A1* | 7/2018 | Herekar | A61N 5/0625 |
| 2018/0360310 A1* | 12/2018 | Berlin | A61B 3/13 |
| 2020/0016002 A1* | 1/2020 | Raksi | A61F 9/00825 |

OTHER PUBLICATIONS

Lam et al. (2021). Anatomy of the Aqueous Outflow Drainage Pathways. 10.1007/978-981-15-5632-6_2. https://www.researchgate.net/publication/346638467_Anatomy_of_the_Aqueous_Outflow_Drainage_Pathways, viewed on Feb. 20, 2025 (Year: 2021).*

Extended European Search Report in European Patent Application No. 19838354.9 issued Aug. 6, 2021.

Chai, D. 2008 "The effects of femtosecond laser created drainage channels on the aqueous humor outflow dynamics of the eye" retrieved online from pdfs.semanticscholor.org/16c4/f88ce928af24aef82615cfc9191778ce8dcc.pdf.

International Search Report and Written Opinion in International Application No. PCT/US2019/041834, mailed Oct. 17, 2019.

Chai, D. et al. 2008 "3D Finite Element Model of Aqueous Outflow to Predict the Effect of Femtosecond Laser Created Partial Thickness Drainage Channels", *Lasers in Surgery and Medicine*, 40:188-195.

Extended European Search Report in European Patent Application No. 19838354.9, issued May 2, 2024.

* cited by examiner

SURGICAL TREATMENT FOR GLAUCOMA

STATEMENT REGARDING FEDERALLY SPONSORED RESEARCH

This invention was made with government support under Grant Nos. RO1 EY014456-01 and RO1 EY030304-01, awarded by the National Institutes of Health (NIH). The government has certain rights in the invention.

FIELD

The disclosure relates to a medical device used in ophthalmology and surgical treatment of glaucoma. Surgical treatment of glaucoma generally aims for increasing the aqueous humor (AH) outflow, therefore decreasing the intraocular eye pressure.

BACKGROUND

An array of glaucoma surgeries are available, including Conventional Filtration Surgery, Minimally Invasive Glaucoma Surgery (MIGS), Argon Laser Trabeculoplasty, (ALT), Selective Laser Trabeculoplasty (SLT) and Excimer Laser Trabeculostomy (ELT).

Conventional Filtration Surgery: Glaucoma filtration surgery has been commonly used for over 40 years. Though with the arrival of intraocular pressure (IOP) regulating drugs and less invasive laser procedures, filtration surgery is only used as a last resort when the risks to vision outweigh the risks of surgery (Shaarawy T, et al. 2015 Surv Ophthalmol 60:327-345). The most common filtration surgery is penetrating trabeculectomy, whereby a partial thickness sclera flap is cut after which an opening into the anterior chamber (AC) is created. The flap is sutured back into place thus forming a subconjunctival bleb into which AH drains and filters out of the eye. This and similar procedures lower IOP, but are associated with hypotony (24%), flat AC (24%), hyphema (25%), and bleb leak (18%) (Shaarawy T, et al. 2015 Surv Ophthalmol 60:327-345). The high rate of complications is a significant limitation to conventional surgery. Bleb fibrosis and filtration failure rate is roughly 50% at 5 years (Iverson S M, et al. 2015 Jpn Ophthalmol 59:179-186). Another popular conventional surgery is the implantation of a shunt. Much like trabeculectomy, the sclera is partially dissected and a shunt is inserted linking the AC to the subconjunctival space, where a bleb is formed. The tube versus trabeculectomy study (TVT) revealed a 29.8% and 46.9% failure rate at 5 years for tube and trabeculectomy procedures, respectively (Gedde, S J, et al. 2012 Am J Ophthalmol 153:789-803 c782). Additionally, the outflow rate increase is not adequately controlled with the filtration surgery.

Minimally Invasive Glaucoma Surgery (MIGS): Recently, MIGS have gained favor as they can be performed ab-interno or ab-externo without disrupting the sclera and conjunctiva. This qualification stands in stark contrast to traditional filtration procedures, such as mechanical trabeculectomy and subconjunctival drainage shunts in which the full thickness of the sclera and outflow structures are manipulated. Many MIGS procedures involve the implantation of small stents traversing from the AC into the Schlemm's canal (SC). These devices are typically very small, on the order of 1 mm, and provide a direct route from the anterior chamber to the collector channels. One such device is the iStent (Glaukos Corporation, San Clemente, CA), which has been shown to reduce IOP by 17% at 15 months post-implantation (Richter G M, et al. 2016 Clin Ophthalmol 10:189-206). The Trabectome (Neomedlx, Tustin CA, USA) also qualifies as a MIGS procedure. The Trabectome is a trabeculectomy procedure in which a strip of trabecular meshwork (TM) and the inner wall of the SC (60-120°) are removed via an electrocautery hand piece, thus providing AH direct access to collector channels (Richter G M, et al. 2016 Clin Ophthalmol 10:189-206). Though designated as minimally invasive, these examples still require a clear, corneal incision. Cyclophotocoagulation (CPO) is another MIGS procedure during which laser light is delivered either trans-sclerally or gonioscopically to destroy portions (270-360°) of the ciliary body to reduce AH secretion (Seibold L K, et al. 2015 J Ophthalmal 22:18-24).

Argon Laser Trabeculoplasty, (ALT): Though its use has decreased in the last decade, a common surgical intervention is often a laser-based procedure called argon laser trabeculoplasty, (ALT), in which the TM is ablated with the goal of increasing AH outflow facility. ALT was historically considered in patients with primary open angle glaucoma (POAG) requiring lower IOP with maximum tolerated drug therapy. Studies have indicated that initial ALT for the treatment of POAG can be as efficient as medications, with approximately 80% of the treated eyes showing a drop in IOP of 7 to 13 mm Hg (Odberg. T. et al. 1999 Acta Ophthalmologica Scandinavica 77:176-181; Group GLTR. 1995 "The Glaucoma Laser Trial (GLT) and glaucoma laser trial follow-up study: 7. Results" Am J Ophthalmol 120: 718-731). As with drug treatments, the primary problem with ALT is that effectiveness is relatively short lived (Weber, P A, et al. 1989 Ophthalmic Surg 20:702-706; Feldman R M, et al. 1991 Ophthalmology 98:1061-1065) and questionable after failed medical drug therapy (AGIS I. 2002 American Journal of Ophthalmology 134:481-498). The mechanism of action in ALT is thought to be laser mediated burns in the TM which in turn causes collagen and tissue contraction. This is thought to increase AH outflow into Schlemm's canal (Rodrigues, M M, et al. 1982 Ophthalmology 89:198-210; Kagan D B, et al. 2014 Clin experiment Ophthalmol 42:675-681).

Selective Laser Trabeculoplasty (SLT): SLT has gained popularity in the past decade as an alternative to ALT. This procedure utilizes a Q-switched ND: YAG laser to deliver nanosecond pulses of 532 nm light to the trabecular meshwork (Latina M A, 2005 Ophthalmol Clin North Am 18:409-419). The light "selectively" targets the pigmented cells of the trabecular meshwork causing physical and biochemical alteration to the outflow pathway (Kagan D B, et al. 2014 Clin experiment Ophthalmol 42:675-681). There is some evidence suggesting progenitor like cells in the anterior non-filtering portion of the TM (near Schwalbe's line) are recruited in response to trabecular meshwork injury. These cells move in and replace the TM cells damaged during SLT. These new TM cells in turn release cytokines responsible for signaling the Schlemm's canal endothelial cells to increase hydraulic conductivity. It is thought that the effect of SLT is largely biological as the laser does not create a physical channel through which the AH can filter, but rather stimulates an increase in permeability of the inner wall of Schlemm's canal (Kagan D B, et al. 2014 Clin experiment Ophthalmol 42:675-681). However, SLT is associated with increased anterior chamber reactions and a limited time window for effectiveness (Latina M A, et al. 1995 Experimental Eye Research 60:359-371; Damji K F, et al. 1999 The British Journal of Ophthalmology 83:718-722). Three studies reviewing the efficacy of SLT have found an average time to failure of 18 months (Ayala M, et al. 2011 Clin Ophthalmol 5:573-576; Ayala M, et al. 2011 Open Ophthalmol J 5:32-34; and Ayala M. et al. 2014 J Glaucoma 23:616-619) while another revealed a 25% success rate at 5 years (Lai J. S. et al. 2004 Clin Experiment Ophthalmol 32:368-372). By comparison, argon laser trabeculoplasty was found to have a success rate of 59% at three years and 50% at 5 years (Grinich, N. P. et al. 1987 Ophthalmology 94:858-861; Bovell A M, et al. 2011 Can J Ophthalmol 46:408-413).

Excimer Laser Trabeculostomy (ELT): A 308 nm excimer laser is fiber coupled and invasively inserted into the anterior chamber through a corneal incision. Then, the optical fiber is pushed against the trabecular meshwork and the excimer laser beam is used to photo-ablate channels from the AC into the SC through the TM. ELT has resulted in long lasting IOP reduction, however the procedure is invasive and lacks control over the amount of tissue ablation and thus IOP reduction (Berlin M S, et al. 2009 Glaucoma Today; Berlin M S, et al. 1987 Am J Ophthalmol 103:713-714).

In summary, there are numerous surgical techniques available to increase the AH outflow, and therefore decrease the IOP. Although some of these surgical techniques provide temporary IOP reduction, all of them lack precise control over the magnitude of the reduction. Relevant published applications and issued patents are listed below in Tables 1 and 2.

TABLE 1

| U.S. Application Publication Number | Title |
| --- | --- |
| 2017-0127938 | SYSTEMS AND METHODS FOR OBTAINING LOW-ANGLE CIRCUMFERENTIAL OPTICAL ACCESS TO THE EYE |
| 2012-0283557 | METHOD AND APPARATUS FOR THE TREATMENT OF GLAUCOMA USING VISIBLE AND INFRARED ULTRASHORT LASER PULSES |
| 2016-0095751 | METHODS AND APPARATUSES FOR THE TREATMENT OF GLAUCOMA USING VISIBLE AND INFRARED ULTRASHORT LASER PULSES |
| 2015-0313759 | SYSTEMS AND METHODS TO DELIVER PHOTODISRUPTIVE LASER PULSES INTO TISSUE LAYERS OF THE ANTERIOR ANGLE OF THE EYE |
| 2015-0305940 | SYSTEMS AND METHODS TO DELIVER PHOTODISRUPTIVE LASER PULSES INTO TISSUE LAYERS OF THE ANTERIOR ANGLE OF THE EYE |
| 2015-0305939 | SYSTEMS AND METHODS TO DELIVER PHOTODISRUPTIVE LASER PULSES INTO TISSUE LAYERS OF THE ANTERIOR ANGLE OF THE EYE |
| 2015-0157505 | DEVICES AND METHODS FOR GENERATION OF SUBSURFACE MICRO DISRUPTIONS FOR OPTHALMIC SURGERY AND APPLICATIONS |
| 2015-0077528 | SURGICAL NAVIGATION SYSTEM AND METHOD |
| 2002-0013572 | DELIVERY SYSTEM AND METHOD OF USE FOR THE EYE |
| 2014-0216468 | BI-RADIAL PATIENT INTERFACE |
| 2012-0303007 | SYSTEM AND METHOD FOR USING MULTIPLE DETECTOR |

TABLE 2

| U.S. Pat. No. | Title |
| --- | --- |
| U.S. Pat. No. 9,033,963 | SYSTEMS AND METHODS TO DELIVER PHOTODISRUPTIVE LASER PULSES INTO TISSUE LAYERS OF THE ANTERIOR ANGLE OF THE EYE |
| U.S. Pat. No. 8,230,866 | SYSTEMS AND METHODS FOR TREATING GLAUCOMA AND SYSTEMS AND METHODS FOR IMAGING A PORTION OF THE EYE |
| U.S. Pat. No. 9,642,746 | GLAUCOMA SURGERY METHODS AND SYSTEMS |
| U.S. Pat. No. 8,679,089 | GLAUCOMA SURGERY METHODS AND SYSTEMS |
| U.S. Pat. No. 9,629,750 | SURGICAL LASER UNIT WITH VARIABLE MODES OF OPERATION |
| U.S. Pat. No. 9,517,006 | SYSTEMS METHODS FOR OBTAINING LOW-ANGLE CIRCUMFERENTIAL OPTICAL ACCESS TO THE EYE |
| U.S. Pat. No. 7,282,046 | GLAUCOMA TREATMENT METHOD |
| U.S. Pat. No. 8,568,393 | COMPUTER GUIDED LASER TRABECULOPLASTY |
| U.S. Pat. No. 9,681,985 | SYSTEM AND METHOD FOR MINIMALLY TRAUMATIC OPHTHALMIC PHOTOMEDICINE |
| U.S. Pat. No. 9,498,295 | OPTIMIZATION OF LASER THERAPY |
| U.S. Pat. No. 9,554,702 | MICROSCOPE-LESS WIDE FIELD-OF-VIEW SURGICAL OCT VISUALIZATION SYSTEM |
| U.S. Pat. No. 8,920,407 | OPTICAL SYSTEM FOR OPHTHALMIC SURGICAL LASER |
| U.S. Pat. No. 9,320,650 | METHOD AND APPARATUS FOR PRECISION WORKING OF AN EYE |
| U.S. Pat. No. 8,171,937 | METHOD AND APPARATUS FOR PRECISION WORKING OF MATERIAL |
| U.S. Pat. No. 7,351,241 | METHOD AND APPARATUS FOR PRECISION WORKING OF MATERIAL |
| U.S. Pat. No. 7,131,968 | APPARATUS AND METHOD OF OPHTHALMOLOGIC SURGICAL PROCEDURES USING A FEMTOSECOND FIBER LASER |
| U.S. Pat. No. 9,724,238 | OPHTHALMIC INTERFACE APPARATUS, METHOD OF INTERFACING A SURGICAL LASER WITH AN EYE, ANDSUPPORT RING FOR USE WITH A SUCTION RING |
| U.S. Pat. No. 8,845,624 | ADAPTIVE PATIENT INTERFACE |
| U.S. Pat. No. 8,523,926 | DEVICES AND METHODS FOR GENERATION OF SUBSURFACE MICRODISRUPTIONS FOR BIOMEDICAL APPLICATION |
| U.S. Pat. No. 6,482,199 | METHOD AND APPARATUS FOR HIGH PRECISION VARIABLE RATE MATERIAL REMOVAL AND MODIFICATION |

SUMMARY

We disclose a device and a method for surgical treatment of glaucoma.

Some embodiments relate to a glaucoma treatment apparatus comprising:
an imaging device configured to image an anterior segment of the eye,
a laser, and
a hardware processor configured to:
   determine a location and a cross sectional area of a treatment based on an anatomy of the anterior segment of the eye obtained from pre-operative images of the anterior segment of the eye, a pre-operative intraocular pressure (IOP) level, and a target IOP reduction, said anatomy including the trabecular meshwork (TM), the Schlemm's Canal (SC) and collector channels (CCS), and
   actuate the laser to create an outflow channel with the cross-sectional area and location in order to achieve the target intraocular pressure (IOP) reduction.

In some embodiments, the glaucoma treatment apparatus further includes a suction ring configured to keep the apparatus steady on the eye during a treatment procedure.

In some embodiments, the apparatus is configured to automatically create drainage channels in between the AC and the SC, based on output from the hardware processor.

In some embodiments, the treatment laser has a pulse duration ranging from 50 fs to 50 ns.

In some embodiments, the treatment laser has a wavelength ranging from 400 nm to 2000 nm.

In some embodiments, the treatment laser has a repetition rate ranging up to 500 KHz.

In some embodiments, the imaging device is selected from the group consisting of a light microscope, an ultrasound device, a computed tomography (CT) device, a magnetic resonance imager (MRI), a system that utilizes molecular imaging, a system that utilizes nuclear medicine, a positron emission tomography (PET) system, a radiography system, and a fluoroscopy system.

Some embodiments relate to a method of reducing intraocular pressure in an eye including:

acquiring a pre-operative image of the anterior segment of the eye, using an algorithm based on the customized anatomy of the anterior segment including the TM, SC and CCS obtained from a pre-operative images of the anterior segment of the eye, a pre-operative IOP level and a target IOP reduction as an inputs, to determine a location and a cross-sectional area of treatment or various locations and a cross-sectional area of multiple treatments in the trabecular meshwork of the eye that will allow precise personalized control over intraocular pressure reduction.

targeting the trabecular meshwork with laser pulses of short durations to create drainage channels in between the anterior chamber (AC) and the Schlemm's canal (SC), and draining of aqueous humor from the anterior chamber to the SC to reduce intraocular pressure in the eye, wherein the channels mediate precise and customized control over the magnitude and/or rate of drainage of the aqueous humor into the SC.

In some embodiments of the method, the laser pulses of short durations used for the treatment range from 50 fs to 50 ns.

In some embodiments of the method, wavelength(s) of the laser pulses of short durations used for the treatment range from 400 nm to 2000 nm.

In some embodiments of the method, a repetition rate of the laser pulses of short durations used for the treatment ranges up to 500 KHz.

In some embodiments of the method, in the algorithm, the anterior chamber is modeled as a hemisphere.

In some embodiments of the method, the hemisphere is modeled with a diameter of 12 mm along the edge of the iris.

In some embodiments of the method, in the algorithm, the height of the trabecular meshwork (TM) is modeled to range from 0.38 to 0.86 mm.

In some embodiments of the method, in the algorithm, the height of the trabecular meshwork (TM) is modeled to have an average height of 0.6 mm.

In some embodiments of the method, in the algorithm, the final destination of aqueous humor (AH) flow is modeled to have a constant pressure boundary condition of 9.6 mmHg, corresponding to the back-pressure in the episcleral venous system.

In some embodiments of the method, the algorithm is based on the Navier-Stokes equation and continuity equations, where the AH is described as incompressible fluid, modified to describe steady state flow and to describe AH dynamics in the model:

$$-\nabla[\eta(\nabla \underline{u}+(\nabla \underline{u})^T)]+\rho \underline{u}\nabla \underline{u}+\nabla P=0, \nabla \underline{u}=0, \text{ and}$$

wherein flow through the trabecular meshwork is governed by the steady state Brinkman equation:

$$-\nabla[\eta(\nabla \underline{u}+(\nabla \underline{u})^T)]+\nabla P + \frac{\eta}{\kappa}\underline{u}=0, \nabla \underline{u}=0$$

where $\underline{u}$ is velocity (m/s), $\rho$ is density (kg/m$^3$), $\eta$ is dynamic viscosity (Pa* second), F is body force (N), and k is permeability (m$^2$).

Some embodiments relate to the use of the glaucoma treatment apparatus disclosed herein to target the trabecular meshwork with laser pulses of short durations to create drainage channels in between the anterior chamber (AC) and the Schlemm's canal (SC), wherein dimensions of the drainage channels and positioning of the drainage channels are calculated using an algorithm based on a customized anatomy of the anterior segment of the eye including the TM, SC and CCS obtained from the pre-operative images of the anterior segment of the eye, a pre-operative IOP level and a target IOP reduction as inputs to determine a location and a cross-sectional area of treatment or various locations and a cross-sectional area of multiple treatments in the trabecular meshwork of the eye that will allow precise personalized control over intraocular pressure reduction.

DETAILED DESCRIPTION

Figure 1:
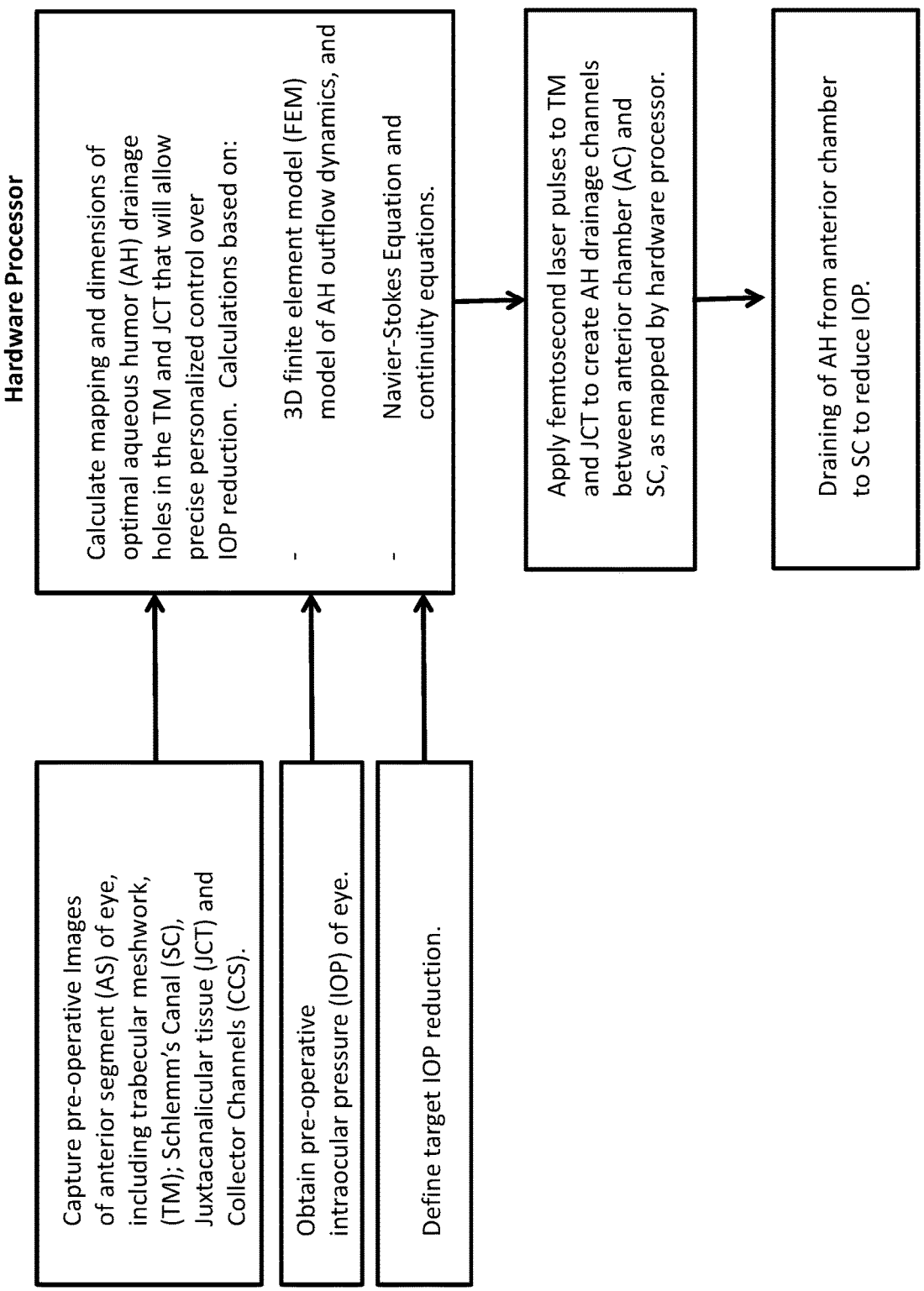
FIG. 1. Flow scheme for mapping locations and dimensions of optimal aqueous humor (AH) drainage holes in the TM and JCT to allow precise personalized control over IOP reduction.

Despite the wide array of available glaucoma surgeries, the limitations of current procedures drive the need for a better alternative. These limitations include: invasiveness of the procedures, relatively quick healing and therefore short efficacy of the procedures, and complete lack of precise control of the IOP reduction. Therefore, future glaucoma treatment technology would benefit from reduced collateral damage and wound healing responses, as well as an increase in spatial precision and precise control over the target IOP reduction. Overall, the next generation glaucoma surgery needs to have the following attributes: 1) be non-invasive to preserve the conjunctival sclera, and cornea, 2) minimize collateral damage to tissue surrounding the treatment site; 3) have high precision (μm scale) to finely control the geometry of the treated tissue and thus the AH outflow increase; 4): be customized and be able to utilize an algorithm based on the anatomy of the anterior segment of the eye including the TM, SC and CCS, a pre-operative IOP as inputs that relates the treatment size with a target IOP reduction providing a better control over the surgical outcome than current technologies. Such treatments may be performed quickly in an outpatient setting.

Current Femtosecond (FS) Laser Technology and its Anterior Segment Applications: High power femtosecond lasers were developed in the early nineties (Salin F, et al. 1991 *Opt Lett* 16:1964-1966; Squier J A, et al. 1993 *Opt Lett* 18:625), though early systems were large, expensive and unreliable for practical applications, advances in ultrafast laser design and solid-state laser pumping sources made femtosecond lasers viable clinical instruments in the late nineties (Sletten K R, et al. 1999 *Ophthalmic Surg Lasers* 30:742-749). The first clinical femtosecond laser was developed exclusively for corneal resections in collaboration between the University of Michigan and IntraLase Corporation under NIH SBIR R44 EY1234-02 (Ratkay-Traub, I. et al. 2001 *Ophthalmol Clin North Am* 14:347-355; Ratkay-Traub, I. et al. 2003 *J Refract Surg* 19:94-103; and Juhasz T, et al. 1999 *Selected Topics in Quantum Electronics, IEEE Journal of* 5:902-910). This system was cleared by the FDA in 2001 and has become the standard of care for several corneal procedures (Kim P, et al. 2011 *Curr Opin Ophthalmol* 22:238-244). OCT guided femtosecond laser technology was developed for performing surgical incisions in cataract surgery (Sandor G L, et al. 2014 *J Refract Surg* 30:660-664; Nagy Z Z, et al. 2013 *J Refract Surg* 29:8; Nagy Z Z, et al. 2013 *J Refract Surg* 29:110-112; Juhasz E, et al. 2014 *J Refract Surg* 30:622-626; Juhasz T. 2012 *Laser Refractive Cataract Surgery: BMC*; pages 75-83; Juhasz T. 2012 "Challenges for Femtosecond Laser Technologies for Cataract Surgery" *Femtosecond Laser Refractive Cataract Surgery*: Springer; pages 39-48 and Juhasz T. Competing Femtosecond Laser technologies for Cataract Surgery. In: Nagy Z Z (ed) Femtosecond Laser Assisted Cataract Surgery: Facts and Results: Slack; 2014 3-10).

This system was also cleared by the FDA and is now widely used to perform capsulotomy, lens fragmentation and corneal incisions during cataract surgery Sandor G L, et al. 2014 *J Refract Surg* 30:660-664; Nagy Z Z, et al. 2013 *J Refract Surg* 29:8; Nagy Z Z, et al. 2013 *J Refract Surg* 29:110-112, Nagy Z Z, et al. 2014 *J Cataract Refract Surg* 40:20-28; Nagy Z Z, et al. 2015 *Eye Vis (Land)* 2:11; Nagy Z Z, et al. 2011 *J Refract Surg* 27:564-569; and Nagy Z Z, et al. 2015; *Orv Hetil* 156:221-225).

Figure 2:
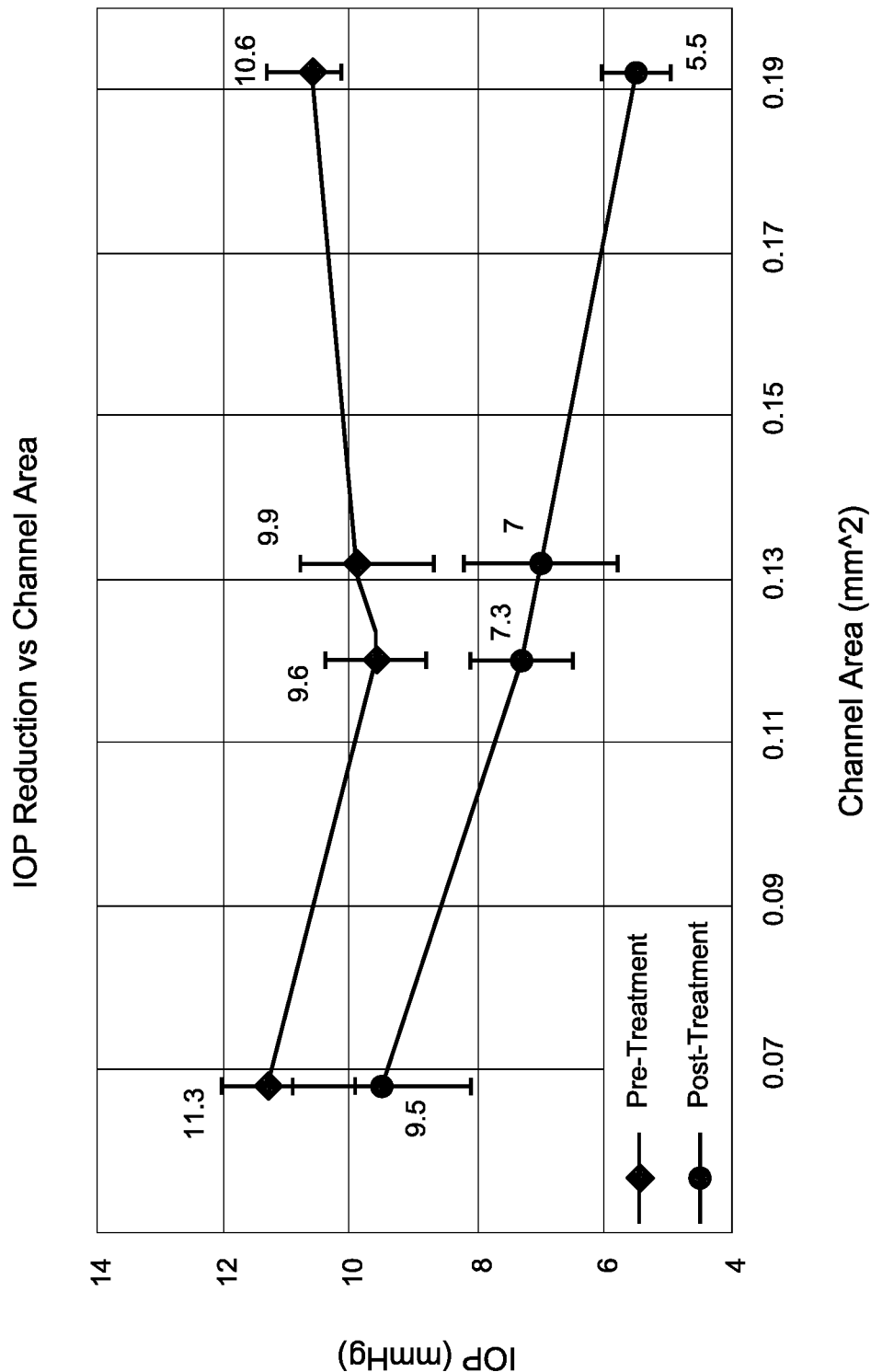
FIG. 2. Treated eyes demonstrate a reduction from pre-operative intraocular pressure (IOP).

1.7 μm femtosecond laser pulses have been delivered through the translucent conjunctiva and sclera and have been shown to be capable of performing high precision, photodisruptive surgery without damage to superficial or adjacent tissues (Chai, D. et al. 2010 *Lasers Surg Med* 42:647-651; Sacks Z S, et al. 2003 *Ophthalmic Surg Lasers Imaging* 34:104-113; and Sacks Z S, et al. 2002 *J Biomed Opt* 7:442-450). Intra-scleral channels created with this method in ex vivo human and rabbit eyes have also been shown to increase outflow facility, suggesting the potential to reduce IOP (Chai D., et al. 2008 *Lasers Surg Med* 40:188-195). In a recent study, we demonstrated that subsurface channels can also be created effectively in vivo using a rabbit model. Treated eyes also demonstrated a reduction from pre-operative IOP, suggesting potential clinical utility (Chai, D. et al. 2010 *Lasers Surg Med* 42:647-651) (FIG. 2). The amount of IOP reduction was shown to scale linearly with the cross-sectional area of the laser created channel, suggesting that modifying the laser channel dimensions can be used to fine tune the reduction. Furthermore, this procedure treated less than 10° of the corneo-scleral rim, thus suggesting potential for retreatment in the remaining 350°. For comparison, procedures such as ALT, SLT, and the Trabectome routinely treat 180°-360° of the angle, thus making retreatment problematic. These studies demonstrated that the creation of subsurface scleral channels of well-defined geometry was possible with 1.7 μm femtosecond laser light. Overall, the procedure was like traditional filtration surgery in that the trabecular meshwork and Schlemm's canal were not precisely targeted. Rather, the channel provided AH access to a thinned scleral region through which it could then filter/percolate.

In a separate in vitro study performed in 4 mm excised strips of the porcine corneoscleral rims, it was demonstrated that, by directly targeting the exposed trabecular meshwork (TM), the TM and juxtacanalicular tissue (JCT) can be ablated with 800 nm FS laser pulses with moderate, 7 to 14 μJ, pulse energies in extremely short, 0.5 to 2 second, exposure times (Toyran, S. et al. 2005 *Experimental Eye Research* 81:298-305). The same group also investigated the feasibility of ablating the TM with FS laser pulses through a gonioscopic contact lens in intact porcine and primate globes, as well as in human cadaver eyes. However, imaging studies of the ablation zone indicated that they failed to ablate through the TM, and did not reach the JCT (Nakamura, H., et al. 2009 *Invest Ophthalmol Vis Sci* 50:1198-1204; Liu Y, et al. 2008 *Ophthalmic Surg Lasers Imaging* 39:485-490). Although perfusion studies were not performed in the treated eyes, it is expected that these treatments would fail to lower the IOP, since the JCT, which is known as the major barrier to the outflow, remained intact.

Figure 3:
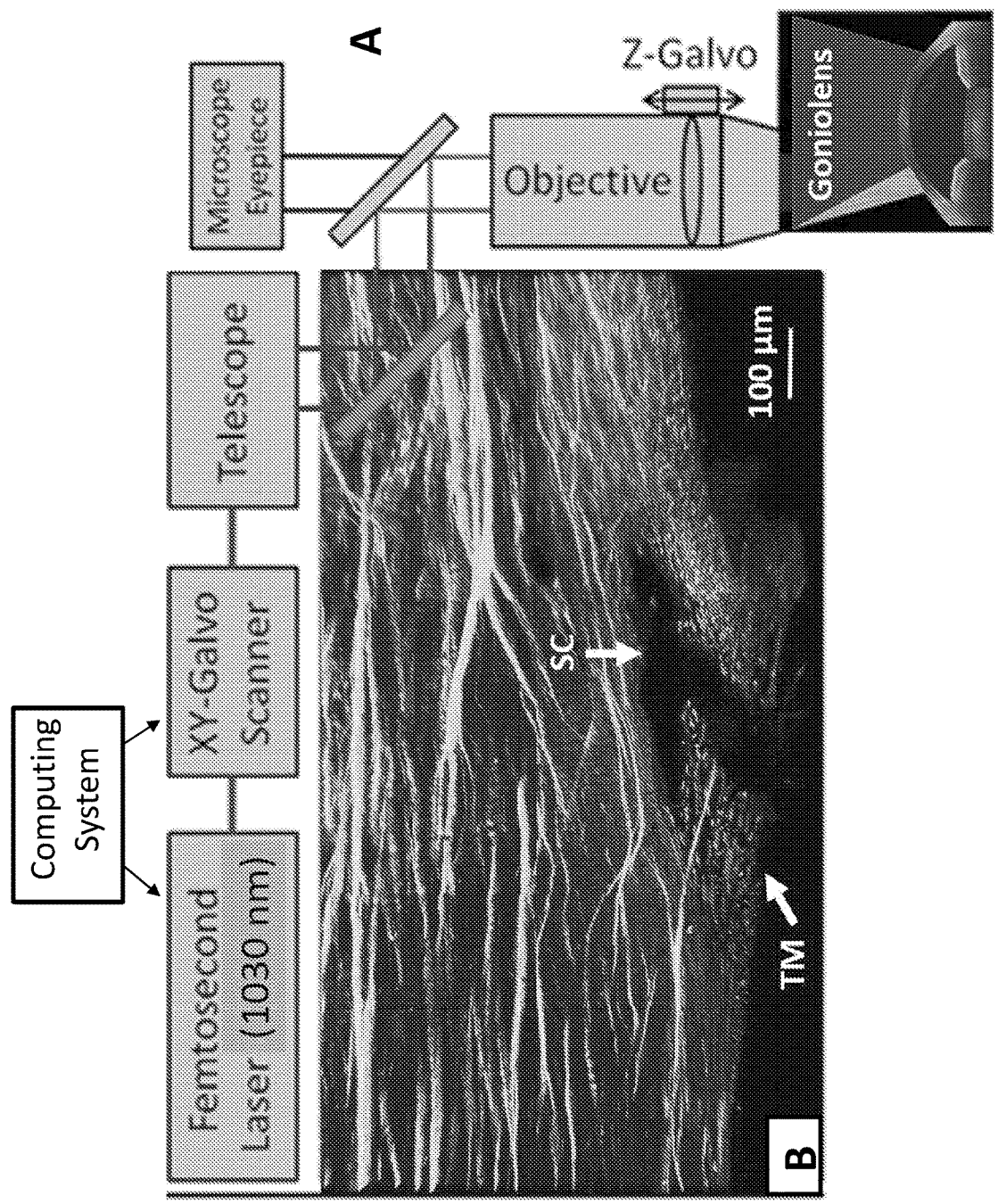
FIG. 3. (A) shows the general experimental setup used, demonstrating ab-interno creation of drainage channels with a goniolens. (B) A second harmonic generation (SHG) image of the drainage channel. (SC-Schlemm's canal, TM-trabecular meshwork).

The potential of FS laser Technology for the treatment of Glaucoma: The results discussed above suggest the importance of locating and targeting the TM, JCT and SC with extraordinary precision for the creation of AH drainage channels with FS laser pulses. In fact, when the significant technical barriers of precisely locating and targeting these anatomical structures in the intact eye with tightly focused FS laser light are overcome, the TM and JCT can be ablated through with practically no collateral tissue damage in a very short period of time (seconds). In recent tissue studies, we demonstrated that drainage channels reaching the SC can be created with femtosecond laser pulses (See FIG. 3) in human cadaver globes. With reference to FIG. 2, subsurface channels created effectively in vivo using a rabbit model resulted in a reduction in post-operative IOP compared to pre-operative IOP.

These studies, as well as the clinical success of FS technology in refractive and cataract surgery indicate that femtosecond technology has the potential to provide a novel treatment for glaucoma with the following advantages:

The potential of a practically non-invasive procedure with no collateral damage to surrounding tissue, the scleral surface, and conjunctiva, thus potentially reducing post-operative scarring and providing clinically relevant longevity.

Micron accuracy implementation of customized outflow channel geometry calibrated to achieve a given increase of AH outflow rate.

Precise control over the IOP reduction by developing an algorithm based on clinical data (to be collected in clinical trials) to determine the cross-sectional area of the treatment.

Since the surgical effect of femtosecond laser pulses is highly precise and the collateral tissue damage is minimal, it is anticipated that the FS laser treatment will provide a precise, long lasting IOP control for a wide range of patients, and therefore, will have significant clinical impact.

We have demonstrated the basic principles of channel creation in the trabecular meshwork in our laboratory. The procedure results in a well-controlled, IOP reduction. Since the cross-section and location of the treatment area is determined by an algorithm based on customized anatomy of the eye obtained from pre-operative images and personalized clinical data, the accuracy of the IOP reduction is better than conventional procedures. Pre-operative images may be acquired with an imaging device, such as a light microscope, ultrasound, computed tomography (CT), magnetic resonance imaging (MRI), molecular imaging, nuclear medicine, positron emission tomography (PET), radiography, and fluoroscopy systems. The femtosecond laser based surgical device described herein performs the procedure completely non-invasively, without any pain and discomfort to the patient, in contrast to performing conventional invasive procedures. The non-invasive nature together with the precise control over the IOP reduction provides a strong competitive advantage to the FS laser based procedure over all the conventional methods.

Description of Algorithm that Determines the Cross-Sectional Area of the Outflow Channel to Achieve the Target IOP Reduction:

To predict the exact size of the drainage channels necessary to create to achieve the target IOP reduction, a novel three dimensional (3D) finite element model (FEM) computer model of the AH outflow dynamics was developed. This novel 3D FEM is advanced to use the anatomy of the anterior segment of the treated eye, including the TM, SC and CCS obtained from pre-operative images, the measured IOP and target IOP reduction as inputs, and calculates the optimal location and cross sectional area of the channels to be created by the FS laser in order to achieve the target IPO. This 3D FEM model is based on the following assumptions:

1. The amount of AH flowing out of the eye through the uveoscleral pathway is not exactly known, but is generally considered to be much less than the outflow through the conventional or trabecular pathway. Therefore, it is assumed that all the AH outflow occurs through the trabecular pathway.

2. The trabecular pathway in the eye is porous, so that outflow through the pathway follows the Brinkman equation and its resistance to outflow can be characterized with permeability in the equation. This assumption is in line with the efforts to quantify the outflow resistance (Barocas V H and Heys J J. 2001 *Invest Ophthalmol Vis Sci* 42(4): 3563 Suppl S.), and ultimately to provide regulated decrease in IOP.

3. The resistance of pathways through TM, juxtacanalicular tissue (JCT) and inner wall endothelium of the SC are characterized by different permeability values since it is known that the JCT and inner wall endothelium of the SC are the major barrier to the outflow.

4. The structures of the eye such as the cornea are rigid materials, and for the precise estimation of the AH outflow parameters deformation of the cornea and movement of the structural components such as lens and iris inside the eye are included in the FEM of the AH outflow. Note that the relationship between IOP and movement of eye structures has been investigated earlier (Kumar S, et al. 2006 *Ann Biomed Eng* 34(3):530-544).

5. The potential impact of temperature on the AH outflow is not considered.

Previous studies demonstrated (Barocas V H and Heys J J. 2001 *Invest Ophthalmol Vis Sci* 42(4): 3563 Suppl S) that there are two potential heat sources that can have impact on AH flow, the temperature difference between the cornea and the rest of the eye and temperature differences created by the blood flow. These temperature gradients can affect AH flow but are neglected in the current model.

Mathematical Model

Figure 4:
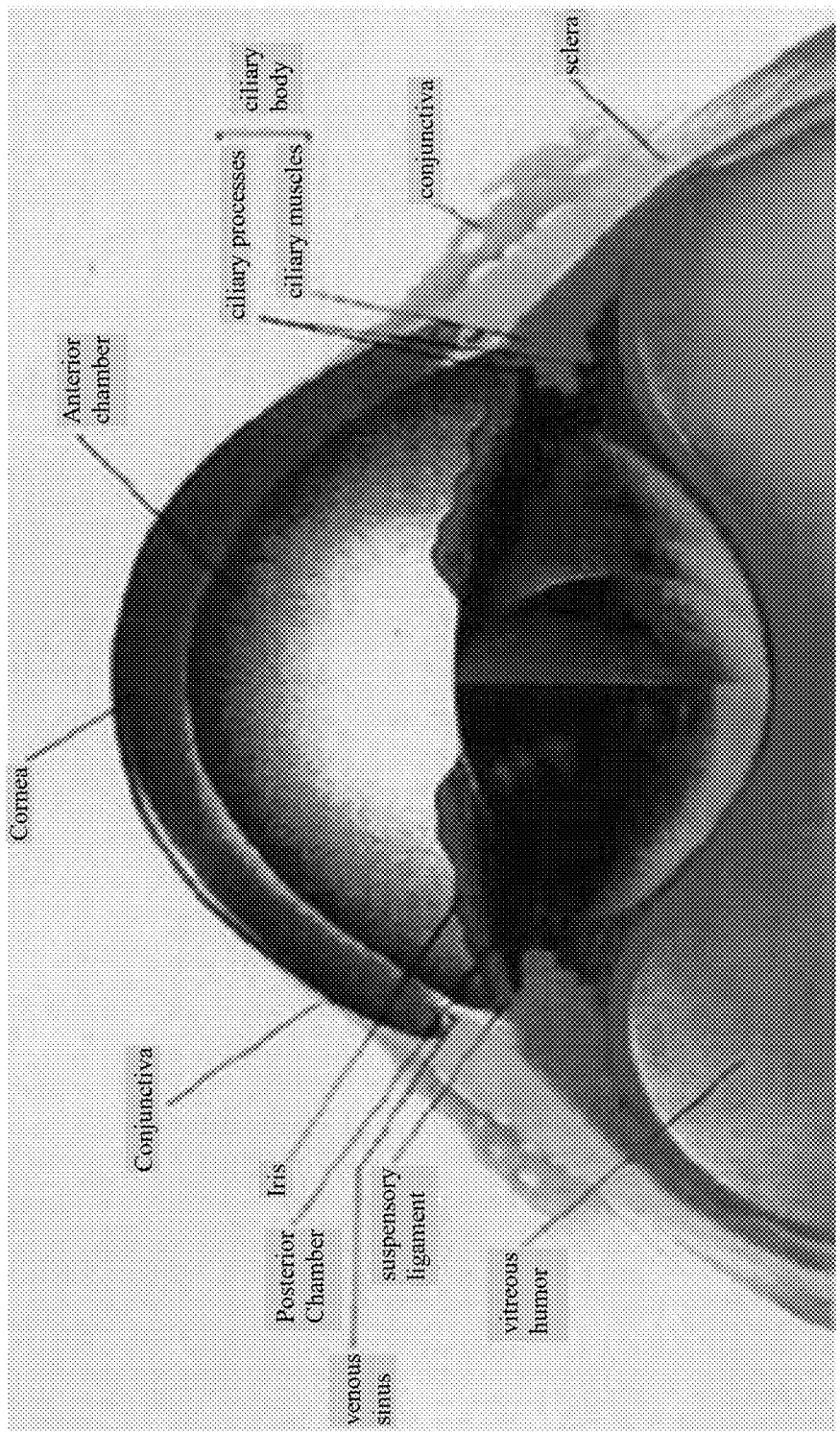
FIG. 4. Schematic of the eye.
Figure 5:
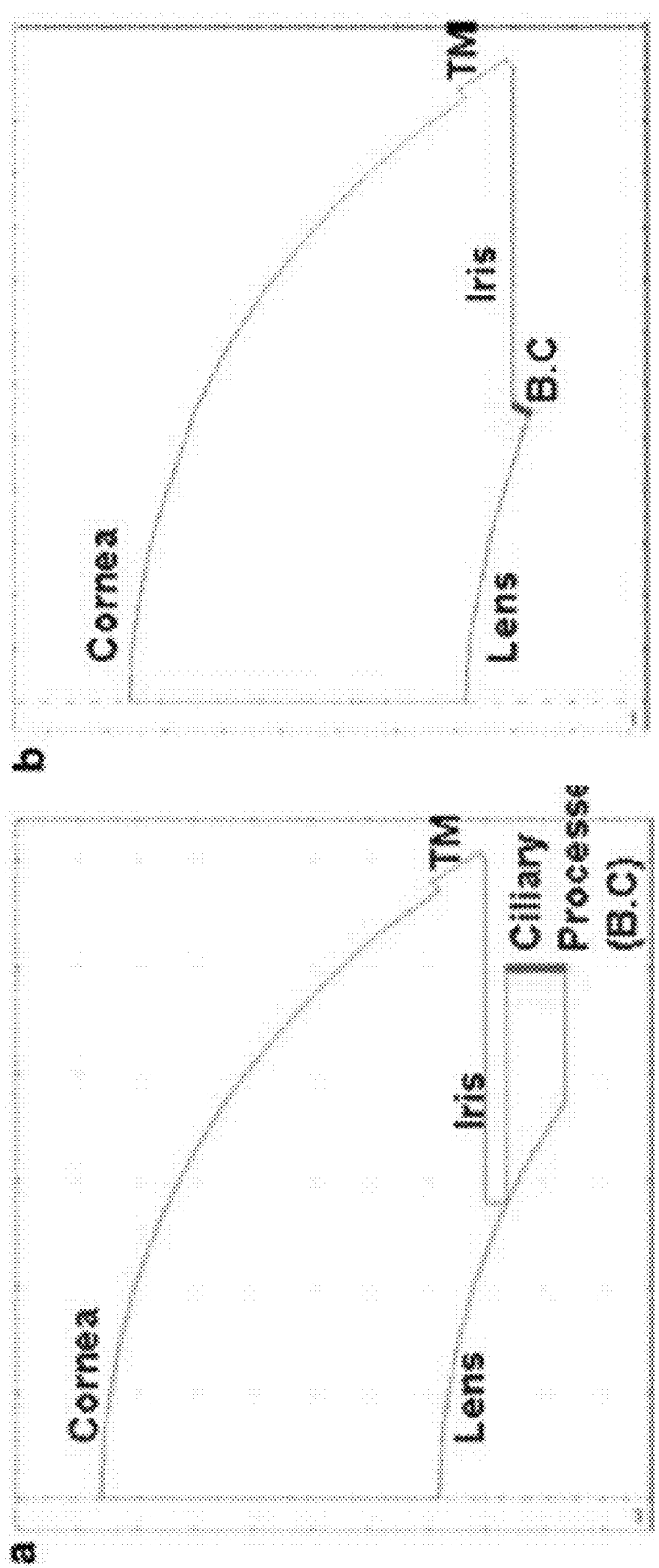
FIG. 5. (a) Schematic of outflow pathway used in 2D model. (b) Modified 2D model.

A schematic of the eye is displayed in FIG. 4. Our preliminary 2D model was constructed so that it focused on AH flow dynamics in the anterior chamber. It was shown that the gap between the lens and iris is on the order of micrometers and doesn't pose any significant resistance to the flow of AH from the posterior chamber to the anterior chamber of the eye. (Chai D, et al. 2007 Proc SPIE 2007 6435:643500-643501, Sokol J, et al. 1996 Ophthalomology 103 (2): 289-293). Thus, this narrow gap needlessly adds to the computational expense of the model without adding any information or validity to the results of the model. Therefore, our model focused on AH dynamics in the anterior chamber. The anterior chamber was modeled as a hemisphere with a diameter of 12 mm along the edge of the iris (Barocas V H and Heys J J. 2001 Invest Ophthalmol Vis Sci 42(4): 3563 Suppl S.). Alternatively, the diameter of the anterior chamber may range from 11.2 mm to 13.2 mm, for example 11.5 mm. 12 mm, 12.5 mm, or 13 mm. The height of the trabecular meshwork (TM) in human eyes ranges from 0.38 to 0.86 mm (Reitsamer H A and Kiel J W 2002 Invest Opthalmology & Visual Science; 43 (12): 3728-3734). Therefore, we used an average height of 0.6 mm. Alternatively, the height of the TM may be 0.4 mm, 0.45 mm, 0.5 mm, 0.55 mm, 0.6 mm, 0.65 mm, 0.7 mm, 0.75 mm, 0.8 mm or 0.85 mm. In order to simplify the model, the AH inflow was assumed to enter anterior chamber through the velocity inlet marked with a line marked B. C. in FIG. 5b, where the gap between the iris and lens would be otherwise. Boundary conditions at the velocity inlet were given so that the inflow rate was the same as those measured in physiological outflow experiments. This eliminates the problems from meshing the narrow iris-lens gap (see FIG. 5, (a) and (b)) for the illustration of the geometry of the 2D model).

Figure 6:
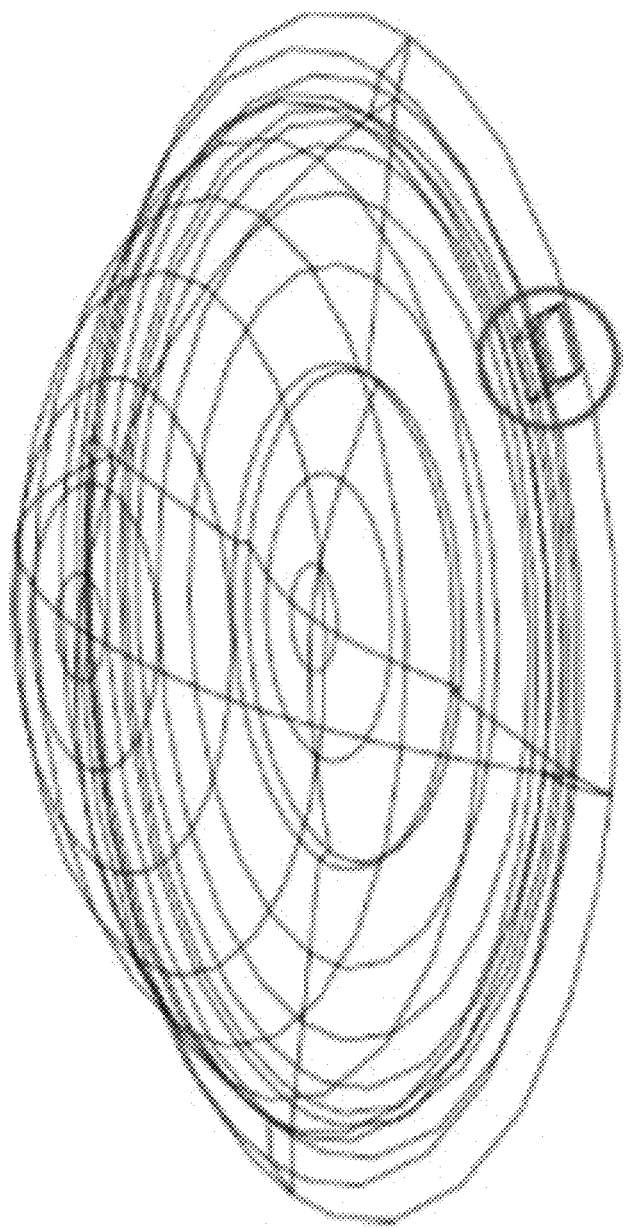
FIG. 6. Geometry of 3D model.

In the living eye, AH flows through the trabecular meshwork, into Schlemm's canal, and then into the collector channels before exiting the eye. Therefore, the final destination of AH flow is modeled to be the constant pressure boundary condition, 9.6 mmHg, corresponding to the back-pressure in the episcleral venous system (Brubaker R F. 1975 Invest Ophthalmol Vis Sci 14 (4): 286-292). The 3D model is developed by the revolution of the modified axially symmetric 2D model by 360 degrees. The pressure may be between 8-12 mm Hg, including intermediate values of 8 mm Hg, 9 mm Hg, 10 mm Hg, 11 mm Hg and 12 mm Hg. The geometry of 3D model with the femtosecond laser created channel (marked with a circle) is shown in FIG. 6. The Navier-Stokes equation and continuity equations, where the AH is described as incompressible fluid were modified to describe steady state flow and used to describe AH dynamics in the model:

$$-\nabla[\eta(\nabla\underline{u}+(\nabla\underline{u})^T)]+\rho\underline{u}\nabla\underline{u}+\nabla P=0, \nabla\underline{u}=0, \text{ and}$$

Flow through the trabecular meshwork is governed by the steady state Brinkman equation:

$$-\nabla\left[\eta(\nabla\underline{u}+(\nabla\underline{u})^T)\right]+\nabla P+\frac{\eta}{\kappa}\underline{u}=0,\ \nabla\underline{u}=0$$

where $\underline{u}$ is velocity (m/s), $\rho$ is density (kg/m$^3$), $\eta$ is dynamic viscosity (Pa* second), F is body force (N), and k is permeability (m$^2$). Each equation was simplified, because we focused on steady state flow in the anterior chamber and in this case the body force is absent. The properties of AH used in model were $\rho$=1,000 kg/m$^3$, $\eta$=1.002×10$^{-3}$ Pa·s. These equations correspond to the stationary flow case.

The equations provided above were solved by COMSOL Multiphysics 3.3 (Comsol, Inc., Burlington, MA) for the finite element mesh and boundary conditions described above. The flow resistance of the trabecular pathway was calculated by fitting the experimental AH outflow data measured in untreated human eyes to the 2D model.

The simulated channel was created through the trabecular meshwork in the 3D model and its flow resistance was assumed to be zero.

The base model calculates the 3D aqueous humor outflow dynamics of the pre-operative eye based on the customized anatomy of the anterior segment including the TM and SC obtained from pre-operative images. Using the pre-operative IOP values as input parameters, the average permeability of the trabecular meshwork is also determined with the help of the model.

Figure 7:
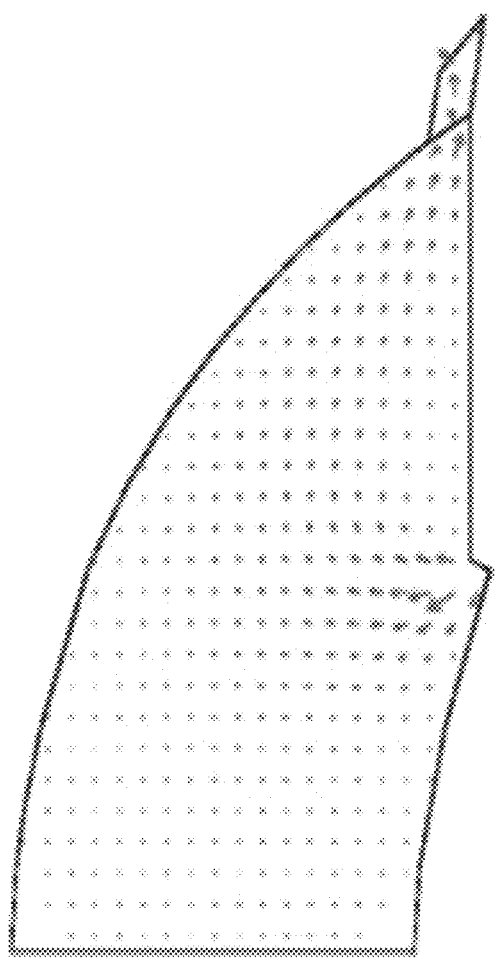
FIG. 7. Profile of the AH flow in the 2D model in the simplified geometry shown in FIG. 5(*b*). Color code represents velocity of AH.
Figure 8:
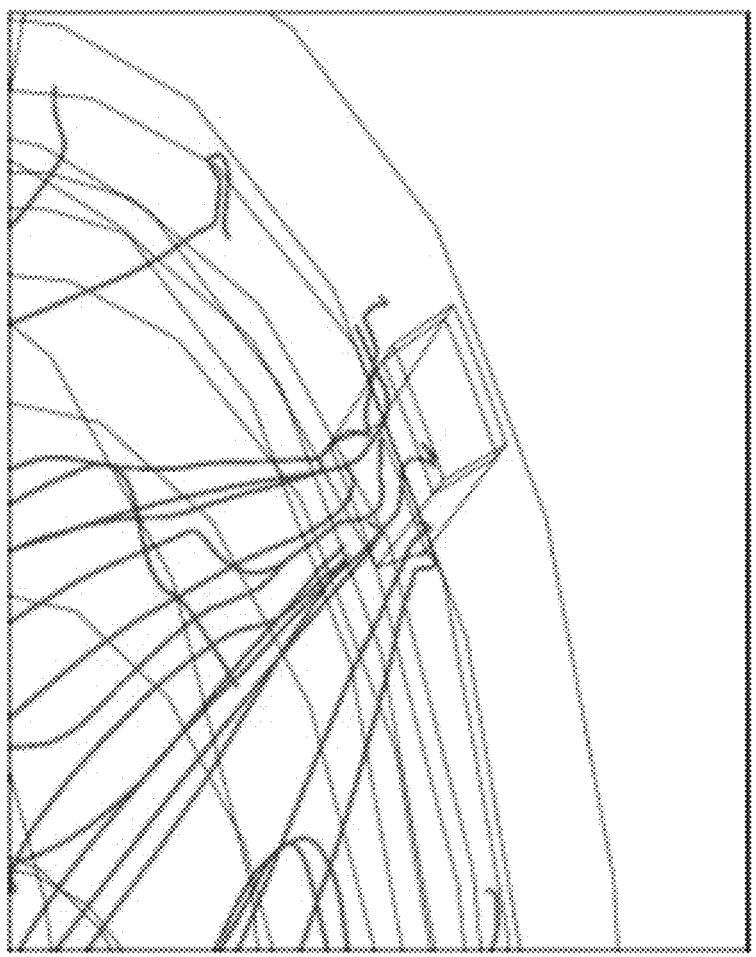
FIG. 8. The AH flow through the channel as shown by the red lines.

In the final step, the target IOP reduction is used as an input and the inverse model is solved to calculate the necessary cross sectional area (of the femtosecond laser created trabecular drainage channel) to achieve the required IOP reduction for a selected location of the channel. By varying the position of selected location the most efficient position of the treatment location can be found, where a unit cross sectional area of the channel provides the largest IOP reduction. Using data from multiple patients the accuracy of the model can be increased. The results from the 2D and 3D model calculations are shown in FIG. 7 and FIG. 8 respectively.

Based on the modeling and calculations by the computing system, femtosecond laser pulses are applied to the TM and JCT to create AH drainage channels between anterior chamber (AC) and SC, as mapped by hardware processor. Typically, between 1-100 drainage channels are created. In some embodiments, the number of channels is about 1, 2, 4, 10, 20, 40, 60, 80 or 100. Drainage channels with cross sectional shapes can be created, for example circular, rectangular, ovoid, hexagonal and any other geometric shape. The diameter of the drainage channels may vary from 10 μm to 600 μm, for example 50 μm, 100 μm, 150 μm, 200 μm, 250 μm, 300 μm, 350 μm, 400 μm, 450 μm and 500 μm. The height of the channels may vary from 10 μm to 600 μm, for example 50 μm, 100 μm, 150 μm, 200 μm, 250 μm, 300 μm, 350 μm, 400 μm, 450 μm, 500 μm and 550 μm, and the width may vary from 10 μm to 10,000 μm, for example 50 μm. 100 μm, 500 μm, 1,000 μm, 2,000 μm, 3,000 μm, 4,000 μm, 5,000 μm, 6,000 μm, 7,000 μm, 8,000 μm, 9,000 μm and 10,000 μm. The length of the drainage channels may vary from 100 μm to 400 μm, for example 150 μm, 200 μm, 250 μm, 300 μm and 350 μm, and it should be sufficient to provide fluid connection in between the AC and the SC.

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

All figures, tables, and appendices, as well as patents, applications, and publications, referred to above, are hereby incorporated by reference.

Some embodiments have been described in connection with the accompanying drawing. However, it should be understood that the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Further, the actions of the disclosed processes and methods may be modified in any manner, including by reordering actions and/or inserting additional actions and/or deleting actions. Thus, it is intended that the scope of at least some of the present inventions herein disclosed should not be limited by the particular disclosed embodiments described above. The limitations in the claims are to be interpreted broadly based on the language employed in the claims and not limited to the examples described in the present specification or during the prosecution of the application, which examples are to be construed as non-exclusive.

What is claimed is:

1. A glaucoma treatment apparatus comprising:
   an imaging device configured to image an anterior segment of the eye,
   a laser, and
   a hardware processor configured to:
   (a) determine a location and a cross sectional area of a treatment based on an anatomy of the anterior segment of the eye obtained from pre-operative images of the anterior segment of the eye, a pre-operative intraocular pressure (IOP) level, and a target IOP reduction, said anatomy including the trabecular meshwork (TM), juxtacanalicular tissue (JCT), the Schlemm's Canal (SC) and collector channels (CCS), wherein the hardware processor is configured to use a three-dimensional (3D) finite element model (FEM) computer model of aqueous humor (AH) outflow dynamics, wherein the 3D FEM uses the anatomy of the TM, JCT, SC and CCS obtained from pre-operative images, the pre-operative IOP and the target IOP reduction as inputs, and calculates the optimal location and cross sectional area of the channels to be created by a femtosecond (FS) laser in order to achieve the target IPO, wherein the 3D FEM model is based on the following assumptions:
  (i) the amount of AH flowing out of the eye through the uveoscleral pathway is not exactly known, but is generally considered to be much less than the outflow through the conventional or trabecular pathway and it is assumed that all the AH outflow occurs through the trabecular pathway;
  (ii) the trabecular pathway in the eye is porous, so that outflow through the pathway follows the Brinkman equation and its resistance to outflow can be characterized with permeability in the equation;
  (iii) the resistance of pathways through TM, juxtacanalicular tissue (JCT) and inner wall endothelium of the SC are characterized by different permeability values since the JCT and inner wall endothelium of the SC are the major barrier to the outflow;
  (iv) the structures of the eye, including the cornea, are rigid materials, and for the precise estimation of the AH outflow parameters deformation of the cornea and movement of the structural components such as lens and iris inside the eye are included in the FEM of the AH outflow; and
  (v) the potential impact of temperature on the AH outflow is not considered; and
(b) actuate the laser to ablate specifically mapped regions of the TM, the JCT and the SC to create one or more aqueous humor (AH) outflow drainage channel(s) with cross-sectional area and location in order to achieve the target IOP reduction.

2. The glaucoma treatment apparatus according to claim 1, further comprising a suction ring configured to keep the apparatus steady on the eye during a treatment procedure.

3. The glaucoma treatment apparatus according to claim 1, wherein the apparatus is configured to automatically create drainage channels in between the anterior chamber (AC) and the SC, based on output from the hardware processor.

4. The glaucoma treatment apparatus according to claim 1 wherein the treatment laser has a pulse duration ranging from 50 fs to 50 ns.

5. The glaucoma treatment apparatus according to claim 1, wherein the treatment laser has a repetition rate ranging up to 500 KHz.

6. The glaucoma treatment apparatus according to claim 1, wherein the imaging device is selected from the group consisting of a light microscope, an ultrasound device, a computed tomography (CT) device, a magnetic resonance imager (MRI), a system that utilizes molecular imaging, a system that utilizes nuclear medicine, a positron emission tomography (PET) system, a radiography system, and a fluoroscopy system.

7. The glaucoma treatment apparatus according to claim 1, wherein in the 3D FEM, the anterior chamber is modeled as a hemisphere.

8. The glaucoma treatment apparatus according to claim 7, wherein the hemisphere is modeled with a diameter of 12 mm along the edge of the iris.

9. The glaucoma treatment apparatus according to claim 1, wherein in the 3D FEM, the height of the TM is modeled to range from 0.38 to 0.86 mm.

10. The glaucoma treatment apparatus according to claim 9, wherein in the 3D FEM, the height of the TM is modeled to have an average height of 0.6 mm.

11. The glaucoma treatment apparatus according to claim 1, wherein in the 3D FEM, the final destination of aqueous humor (AH) flow is modeled to have a constant pressure boundary condition of 9.6 mmHg, corresponding to the back-pressure in the episcleral venous system.

12. The glaucoma treatment apparatus according to claim 1, wherein the 3D FEM is based on the Navier-Stokes equation and continuity equations, where the AH is described as incompressible fluid, modified to describe steady state flow and to describe AH dynamics in the model:

$$-\nabla[\eta(\nabla \underline{u}+(\nabla \underline{u})^T)]+\rho \underline{u} \nabla \underline{u}+\nabla P=0, \nabla \underline{u}=0, \text{ and}$$

wherein flow through the trabecular meshwork is governed by the steady state Brinkman equation:

$$-\nabla\left[\eta(\nabla \underline{u}+(\nabla \underline{u})^T)\right]+\nabla P+\frac{\eta}{\kappa}\underline{u}=0, \nabla \underline{u}=0,$$

where u is velocity (m/s), $\rho$ is density (kg/m$^3$), $\eta$ is dynamic viscosity (Pa* second), and k is permeability (m$^2$).

13. A method of reducing intraocular pressure in an eye comprising:
  acquiring a pre-operative image of the anterior segment of the eye using the glaucoma treatment apparatus according to claim 1, including the TM, the SC and the CCS,
  using the 3D FEM to determine a location and a cross-sectional area of treatment or various locations and a cross-sectional area of multiple treatments in the trabecular meshwork of the eye that will allow precise personalized control over intraocular pressure reduction,
  targeting the TM, the JCT and the SC with laser pulses of short durations to create drainage channels in between the AC and the SC, and
  draining of aqueous humor from the anterior chamber to the SC to reduce intraocular pressure in the eye, wherein the channels mediate precise and customized control over the magnitude and/or rate of drainage of the aqueous humor into the SC.

14. The glaucoma treatment method according to claim 13, wherein the laser pulses of short durations used for the treatment range from 50 fs to 50 ns.

15. The glaucoma treatment method according to claim 13, wherein a repetition rate of the laser pulses of short durations used for the treatment ranges up to 500 KHz.

* * * * *